United States Patent
Sattler et al.

(10) Patent No.: US 11,993,234 B2
(45) Date of Patent: May 28, 2024

(54) AXLE STRUCTURE WITH ASYMMETRICALLY ARRANGED BRAKE CYLINDERS

(71) Applicant: MAN Truck & Bus SE, Munich (DE)

(72) Inventors: Steve Sattler, Munich (DE); Jürgen Hintereder, Munich (DE); Robert Hörmann, Munich (DE)

(73) Assignee: Man Truck & Bus SE, Munich (DE)

( * ) Notice: Subject to any disclaimer, the term of this patent is extended or adjusted under 35 U.S.C. 154(b) by 0 days.

(21) Appl. No.: 17/627,080

(22) PCT Filed: Jul. 6, 2020

(86) PCT No.: PCT/EP2020/068934
§ 371 (c)(1),
(2) Date: Jan. 13, 2022

(87) PCT Pub. No.: WO2021/008911
PCT Pub. Date: Jan. 21, 2021

(65) Prior Publication Data
US 2022/0250604 A1    Aug. 11, 2022

(30) Foreign Application Priority Data

Jul. 13, 2019   (DE) ..................... 10 2019 004 904.7

(51) Int. Cl.
*B60T 17/08* (2006.01)
*B60B 35/16* (2006.01)

(52) U.S. Cl.
CPC .......... *B60T 17/088* (2013.01); *B60B 35/163* (2013.01)

(58) Field of Classification Search
CPC ..... B60T 17/088; B60B 35/163; B60B 11/02; B60B 35/002; B60B 35/122; B60B 35/18;
(Continued)

(56) References Cited

U.S. PATENT DOCUMENTS 6,035,956 A * 3/2000 Maurer .................. B60B 11/02
74/606 R
6,056,081 A * 5/2000 Hatlen ..................... B62D 9/00
280/91.1
(Continued)

FOREIGN PATENT DOCUMENTS

CN    102371846 A    9/2014
CN    102371846 B    9/2014
(Continued)

OTHER PUBLICATIONS

Machine translation of DE 10313485 A1, Eickhoff et al., Nov. 18, 2004 (Year: 2004).*
(Continued)

*Primary Examiner* — Vinh Luong
(74) *Attorney, Agent, or Firm* — Weber Rosselli & Cannon LLP (57) ABSTRACT

The present disclosure relates to an axle structure for a motor vehicle, preferably a utility vehicle, for installing a first wheel and a second wheel. The axle structure has a longitudinal axis and defines a vertical reference plane which extends along the longitudinal axis, and the axle structure comprises a first brake cylinder, which preferably has a first central line and is preferably used to brake the first wheel, and a second brake cylinder, which preferably has a second central line and is preferably used to brake the second wheel. The axle structure is characterized in particular in that the first brake cylinder is arranged on one side of the reference plane, and the second brake cylinder is arranged on the other side of the reference plane.

24 Claims, 8 Drawing Sheets

(58) Field of Classification Search
CPC ... B60B 2310/305; F16H 1/22; B60K 17/043; B60Y 2200/1432; Y10T 74/19628; Y10T 74/19679; Y10T 74/2186
See application file for complete search history.

(56) References Cited

U.S. PATENT DOCUMENTS

| | | | | |
|---|---|---|---|---|
| 2008/0135324 | A1* | 6/2008 | Nemoto | B60K 17/043 180/374 |
| 2018/0370565 | A1 | 12/2018 | White et al. | |
| 2019/0048543 | A1* | 2/2019 | Roy | B60R 21/02 |
| 2020/0180426 | A1* | 6/2020 | Chopra | B60K 17/046 |
| 2020/0276895 | A1* | 9/2020 | Mepham | B60K 17/046 |
| 2022/0072951 | A1* | 3/2022 | Auer | B60K 17/046 |

FOREIGN PATENT DOCUMENTS

| | | | | |
|---|---|---|---|---|
| CN | 107278243 | A | | 10/2017 |
| DE | 19604730 | A1 | | 8/1997 |
| DE | 10313485 | A1 | | 11/2004 |
| DE | 102012013901 | A1 * | 1/2014 | ............ B62D 21/12 |
| DE | 102012013914 | A1 * | 1/2014 | ............ B62D 21/11 |
| DE | 102013112293 | A1 | | 5/2015 |
| EA | 200901094 | A1 | | 6/2012 |
| EP | 0911203 | A2 | | 4/1999 |
| EP | 1462329 | A2 | | 9/2004 |
| EP | 2674319 | A1 | | 12/2013 |
| EP | 2684778 | A2 | | 1/2014 |
| FR | 3052110 | A1 * | 12/2017 | ........... B60K 7/0007 |
| RU | 2500094 | C2 | | 12/2013 |
| WO | 9728980 | A1 | | 8/1997 |
| WO | 03101178 | A1 | | 12/2003 |
| WO | WO 03101178 | A1 * | 12/2003 | ............ A01B 69/00 |
| WO | 2006077680 | A1 | | 7/2006 |
| WO | 2018236734 | A1 | | 12/2018 |

OTHER PUBLICATIONS

Machine translation of WO 03101178 A1, Weiss et al., Dec. 11, 2003 (Year: 2003).*
Machine translation of FR 3052110 A1, Pascal, Dec. 8, 2017 (Year: 2017).*
Machine translation of DE 102012013914 A1, Sattler, Jan. 16, 2014 (Year: 2014).*
Machine translation of DE 102012013901 A1, Sattler, Jan. 16, 2014 (Year: 2014).*
German Search Report issued in German Patent Application No. 102019004904.7 dated Jun. 5, 2020, 4 pages. No English translation available.
PCT Search Report and Written Opinion issued in PCT/EP2020/068934 dated Nov. 2, 2020 with English translations.
Communication after Rule 71(3) EPO issued in European Patent application No. 20737422.4 dated Feb. 22, 2023 with English translation.
Russian Office Action and Search Report issued in Russian Patent Application No. 2021132690/11(068904) dated Oct. 30, 2023.
Decision to Grant issued in Russian Patent Application No. 2021132690/11 dated Jan. 12, 2024 with a machine google translation.
Chinese Office Action and Search Report issued in Chinese Patent Application No. 202080041081.3 dated Feb. 21, 2024 with English translation.

* cited by examiner

AXLE STRUCTURE WITH ASYMMETRICALLY ARRANGED BRAKE CYLINDERS

CROSS-REFERENCE TO RELATED APPLICATIONS

This application is a 371 application of PCT/EP2020/068934 filed Jul. 6, 2020, which claims benefit of and priority to German Patent Application Serial No. DE102019004904.7 filed Jul. 13, 2019, the disclosures of the above-identified applications are hereby incorporated by reference in their entirety.

BACKGROUND

1. Technical Field

The present disclosure relates to an axle construction for a motor vehicle, preferably a utility vehicle, having preferably asymmetrically arranged brake cylinders.

2. Description of Related Art

Utility vehicle brake arrangements which are provided for assembly on utility vehicle axles and which have a brake caliper, a brake cylinder and a brake disk are known in extremely varied configurations. The arrangement of required functional components on and adjacent to the utility vehicle axles is influenced by the space available. There are thereby produced constraints with regard to the arrangement of the functional components. As a result of the generally only limited space available on the utility vehicle axles and/or as a result of the drive technology used (for example, single-wheel motors, combustion engines, electric motors, hydraulic motors, etcetera), however, it is often difficult to arrange functional components at the most optimum possible location and/or to ensure the most compact possible and preferably individual packaging of the functional components.

An object of the present disclosure is to provide a possibility which in particular can ensure a compact and preferably individual packaging of functional components on an axle construction for a motor vehicle, preferably a utility vehicle.

This object can be achieved with the features of the main claim. Advantageous developments are disclosed in the dependent claims or will be appreciated from the following description of preferred embodiments of the present disclosure.

SUMMARY

The present disclosure relates to an axle construction for a motor vehicle, preferably a utility vehicle, for example, a truck, a towing vehicle or a transporter.

The axle construction is advantageously used to mount a first (for example, right) wheel and a second (for example, left) wheel. The first wheel and the second wheel may, for example, be configured with single tires or dual tires (twin tires).

The axle construction comprises a longitudinal axis (for example, center axis) and may, for example, define a vertical reference plane which extends along the longitudinal axis. The reference plane can consequently preferably be defined by means of the vertical orientation thereof and by the longitudinal axis.

The axle construction further comprises a first brake cylinder, which preferably defines a first center line and/or which can be used for braking the first wheel, and a second brake cylinder, which preferably defines a second center line and/or which can be used for braking the second wheel.

The axle construction is preferably characterized in that the first brake cylinder can advantageously be arranged at least partially at, for example, one side of the reference plane (and consequently in particular in the longitudinal direction of the motor vehicle, for example, in front of the axle construction) and the second brake cylinder can advantageously be arranged at least partially at, for example, the other side of the reference plane (and consequently in particular in the longitudinal direction of the motor vehicle, for example, behind the axle construction).

The "one side of the reference plane" (for example, the first side) can consequently preferably constitute the side which is located in the longitudinal direction of the motor vehicle in front of the axle construction, wherein the "other side of the reference plane" (for example, second side) can consequently preferably constitute the side which is located in the longitudinal direction of the motor vehicle behind the axle construction, or vice versa.

It is consequently possible within the context of the present disclosure for the first brake cylinder, for example, in the longitudinal direction of the motor vehicle, to be arranged at least partially in front of the axle construction, wherein the second brake cylinder, for example, in the longitudinal direction of the motor vehicle, is arranged at least partially behind the axle construction, or vice versa.

It is possible for the first center line to extend substantially parallel with the reference plane and/or the longitudinal axis.

The first center line may, for example, be orientated to be inclined away from the reference plane and/or the longitudinal axis, for example, in such a manner that a space between the first brake cylinder and the axle construction can be increased. The second center line may also, for example, be orientated in such a manner that, for example, a space between the second brake cylinder and the axle construction can be increased.

It is possible for the first center line to extend non-parallel with the reference plane and/or with the center line.

The first center line may extend, for example, non-perpendicularly to the reference plane and/or the longitudinal axis.

It is possible for the second center line to extend substantially parallel with the reference plane and/or the longitudinal axis.

The second center line may, for example, be orientated to be inclined toward the reference plane and/or the longitudinal axis, for example, in such a manner that a space between the second brake cylinder and the axle construction can be reduced. The first center line may also, for example, be orientated in such a manner that, for example, a space between the first brake cylinder and the axle construction can be reduced.

It is possible for the second center line to extend non-parallel with the reference plane and/or the longitudinal axis.

The second center line may extend, for example, non-perpendicularly to the reference plane and/or the longitudinal axis.

It is possible for the first center line and the second center line to be orientated to be inclined away from the reference plane and/or the longitudinal axis.

Alternatively, it is possible for the first center line and the second center line to be orientated to be inclined toward the reference plane and/or the longitudinal axis.

It is possible for the axle construction to have an additional vertical reference plane which divides the axle construction uniformly into a left-hand portion and a right-hand portion.

The first brake cylinder and the second brake cylinder are preferably arranged in an asymmetrical manner, for example, relative to the reference plane and/or relative to the additional reference plane.

It is possible for the first center line and the second center line to extend substantially parallel with each other. However, it is also possible for the first center line and the second center line to extend non-parallel with each other.

It is also possible for the first center line and the second center line to be orientated through angles of different sizes and consequently to have, for example, angles of inclination of different sizes, preferably relative to the reference plane and/or longitudinal axis. It is thus possible, for example, for the first center line to have, purely by way of example, an angle of inclination of 30°, whilst the second center line may, purely by way of example, have an angle of inclination of 20°.

The first brake cylinder may, for example, be arranged substantially completely at one side of the reference plane. Alternatively or additionally, the second brake cylinder may, for example, be arranged substantially completely at the other side of the reference plane.

The axle construction is preferably a drive axle construction and consequently constitutes in particular an axle construction which is driven, for example, electrically, hydraulically and/or by means of an internal combustion engine.

The axle construction may, for example, have an axle gear for connecting a drive shaft for driving the motor vehicle.

However, it is also possible for the axle construction to be provided with individual wheel motors (for example, single-wheel drives), in particular for driving the motor vehicle.

The axle construction may have, for example, a first single-wheel motor (advantageously a single-wheel drive) for driving the first wheel and a second single wheel motor (advantageously a single-wheel drive) for driving the second wheel.

It is possible, for example, for the first single-wheel motor to be arranged at least partially or substantially completely at one side of the reference plane (and consequently in particular in the longitudinal direction of the motor vehicle, for example, in front of the axle construction), and/or the second single-wheel motor to be arranged at least partially or substantially completely at the other side of the reference plane (and consequently in particular in the longitudinal direction of the motor vehicle, for example, behind the axle construction.

The axle construction may also have, for example, a first brake caliper and a second brake caliper.

The first brake caliper is associated with the first brake cylinder and is used in particular to brake the first wheel. The second brake caliper is associated with the second brake cylinder and is used in particular to brake the second wheel.

It is possible for the first brake caliper to be arranged at least partially or substantially completely at one side of the reference plane (and consequently in particular in the longitudinal direction of the motor vehicle, for example, in front of the axle construction) and/or for the second brake caliper to be arranged at least partially or substantially completely at the other side of the reference plane (and consequently in particular in the longitudinal direction of the motor vehicle, for example, behind the axle construction).

The first center line and/or the second center line may extend, for example, in a substantially horizontal or non-horizontal manner.

It is possible for the first center line, the second center line and/or the longitudinal axis to extend substantially at the same height.

It should be noted that the shape of the first brake cylinder and/or the second brake cylinder may preferably be substantially circular-cylindrical. However, the shape is not limited thereto, but may advantageously also comprise other shapes.

It should further be mentioned that the axle construction may preferably be a rigid axle construction.

The present disclosure also relates to a motor vehicle, preferably a utility vehicle, having a chassis.

The chassis may preferably be constructed from a large number of chassis modules which are releasably mounted on each other by means of connection node pairs (for example, two upper connection node pairs and two lower connection node pairs).

It is possible for the chassis modules to be able to be releasably mounted on each other, for example, by means of four connection node pairs in each case.

An axle construction as disclosed herein may advantageously be mounted on one of the chassis modules.

The chassis modules may advantageously have as carrier structures, for example, longitudinal carriers, transverse carriers and/or vertical carriers. In the context of the present disclosure, the longitudinal carriers may extend substantially in the longitudinal direction of the motor vehicle, the transverse carriers may extend substantially in the transverse direction of the motor vehicle and/or the vertical carriers may extend substantially in a vertical direction (upward/downward direction) of the motor vehicle.

The longitudinal, transverse and/or vertical carriers may, for example, comprise at least partially sheet metal or profile components, but also, for example, substantially plate-like carrier structures. The profile components may, for example, be closed or open profiles, for example, hollow profiles or, for example, substantially U-, L-, I- or hat-shaped profiles.

It is possible for the individual chassis modules to have, for example, a 3-dimensional carrier structure, for example, a framework and/or box construction.

The connection nodes may, for example, be constructed as a cast, forged or sheet metal component.

The connection node pairs may, for example, be releasably mounted on each other by means of screw or clamp connections or other releasable connection techniques.

The chassis modules may have, for example, four front connection nodes and/or preferably four rear connection nodes.

The preferred embodiments and features of the present disclosure described above can be combined with each other. Other advantageous developments of the present disclosure are disclosed in the dependent claims or will be appreciated from the following description of preferred embodiments of the present disclosure, together with the appended Figures, in which:

DETAILED DESCRIPTION

The preferred embodiments of the present disclosure described in the Figures partially correspond, wherein the same reference numerals are used for similar or identical components and, for the explanation thereof, reference may also be made to the description of the other embodiments. For the sake of clarity, not all the components in all the Figures have been given reference numerals.

Figure 1:
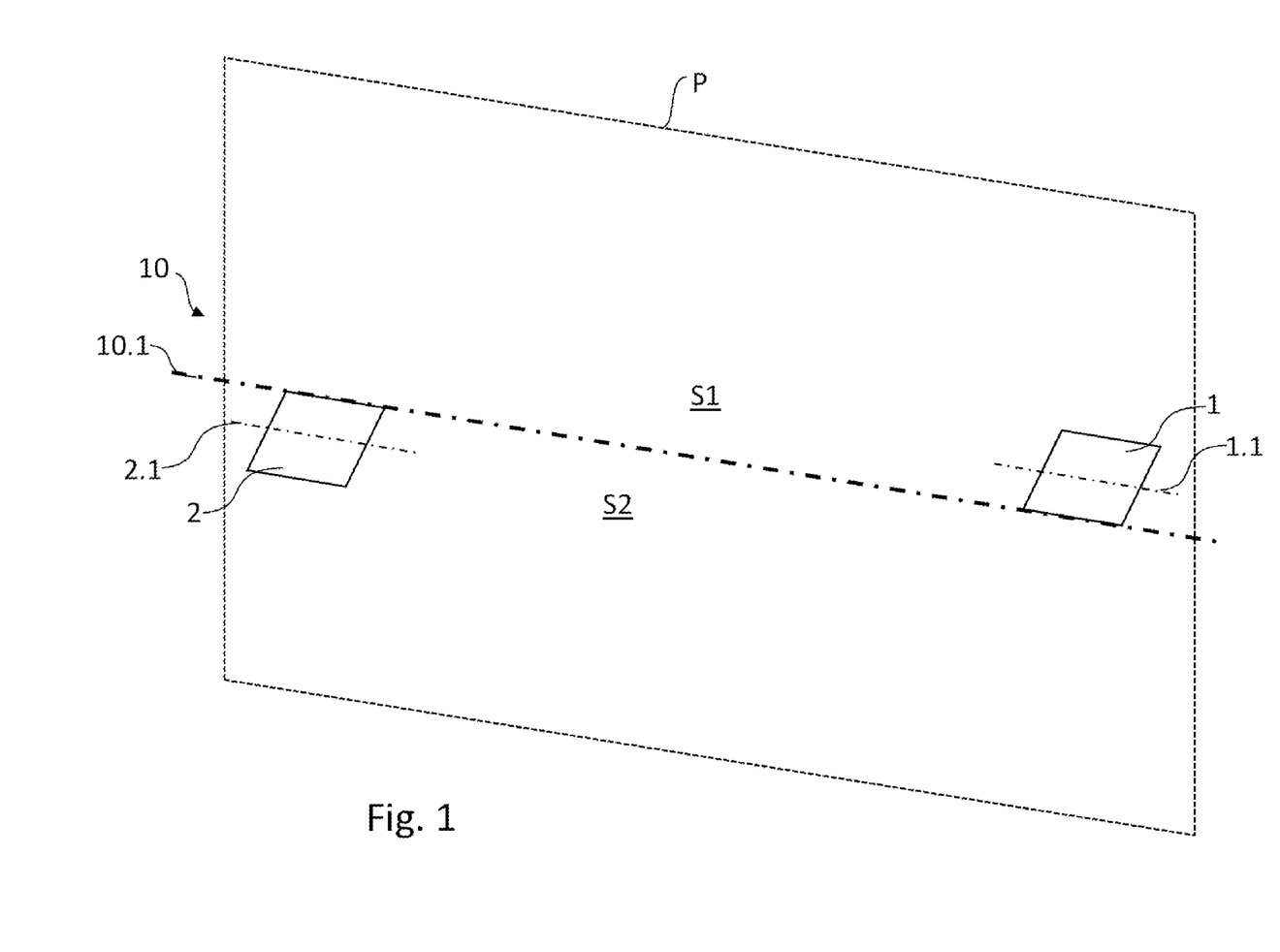
FIG. 1 is a schematic perspective view of an axle construction according to a first embodiment of the present disclosure.
Figure 2:
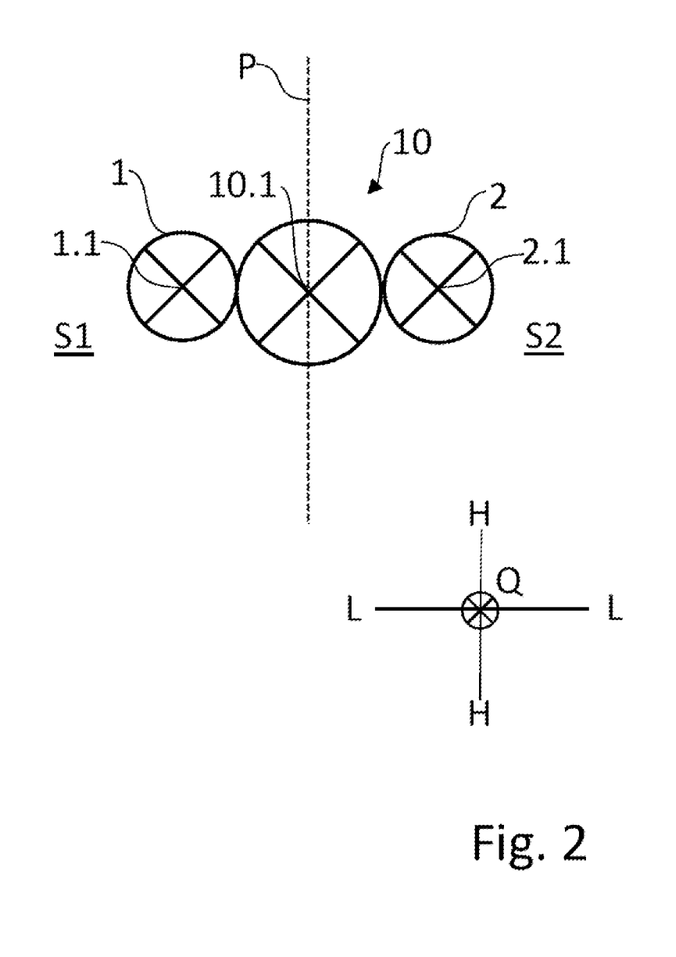
FIG. 2 is a schematic side view of the first embodiment.
Figure 3:
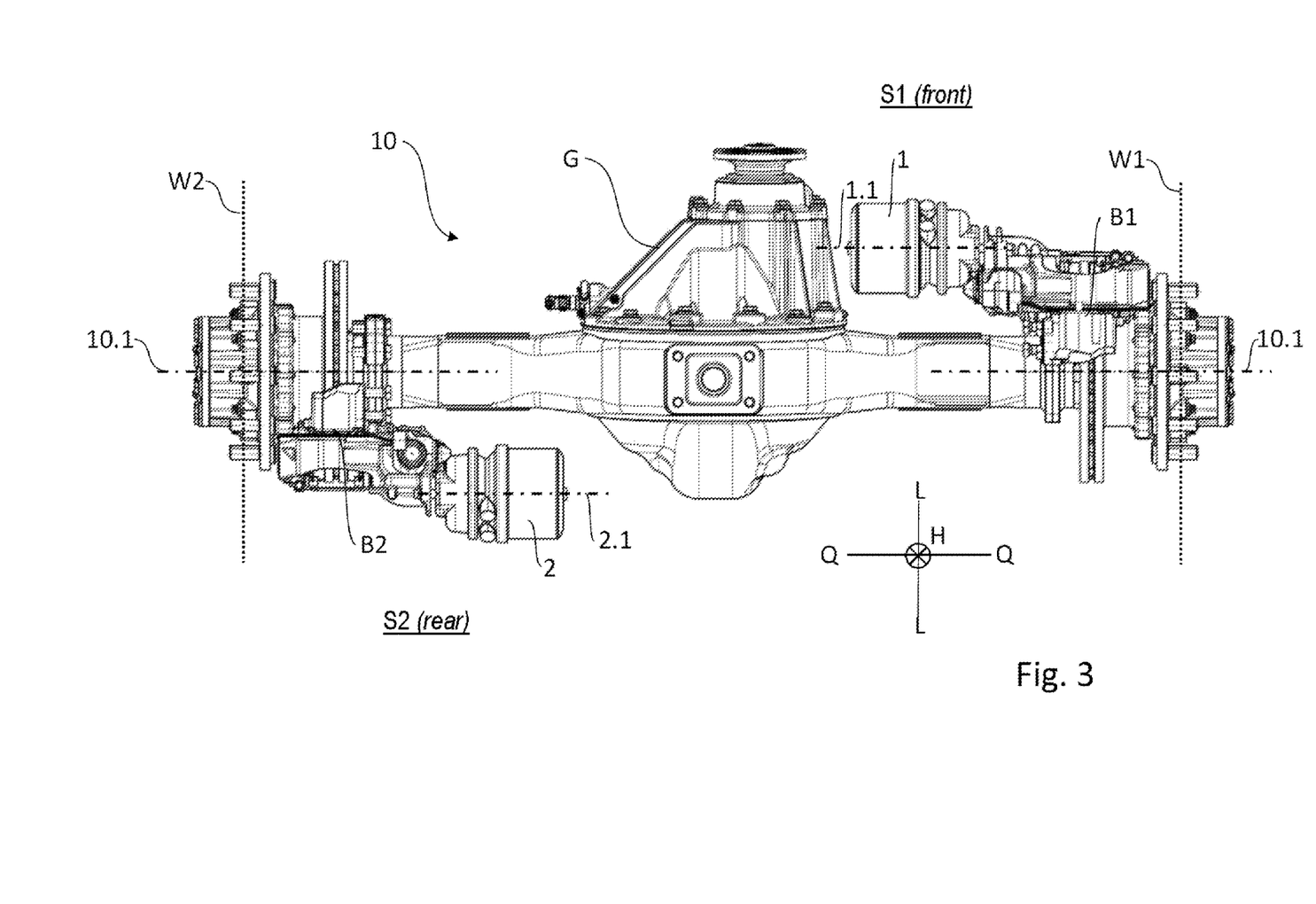
FIG. 3 is a detailed plan view of an axle construction according to the first embodiment.
Figure 4:
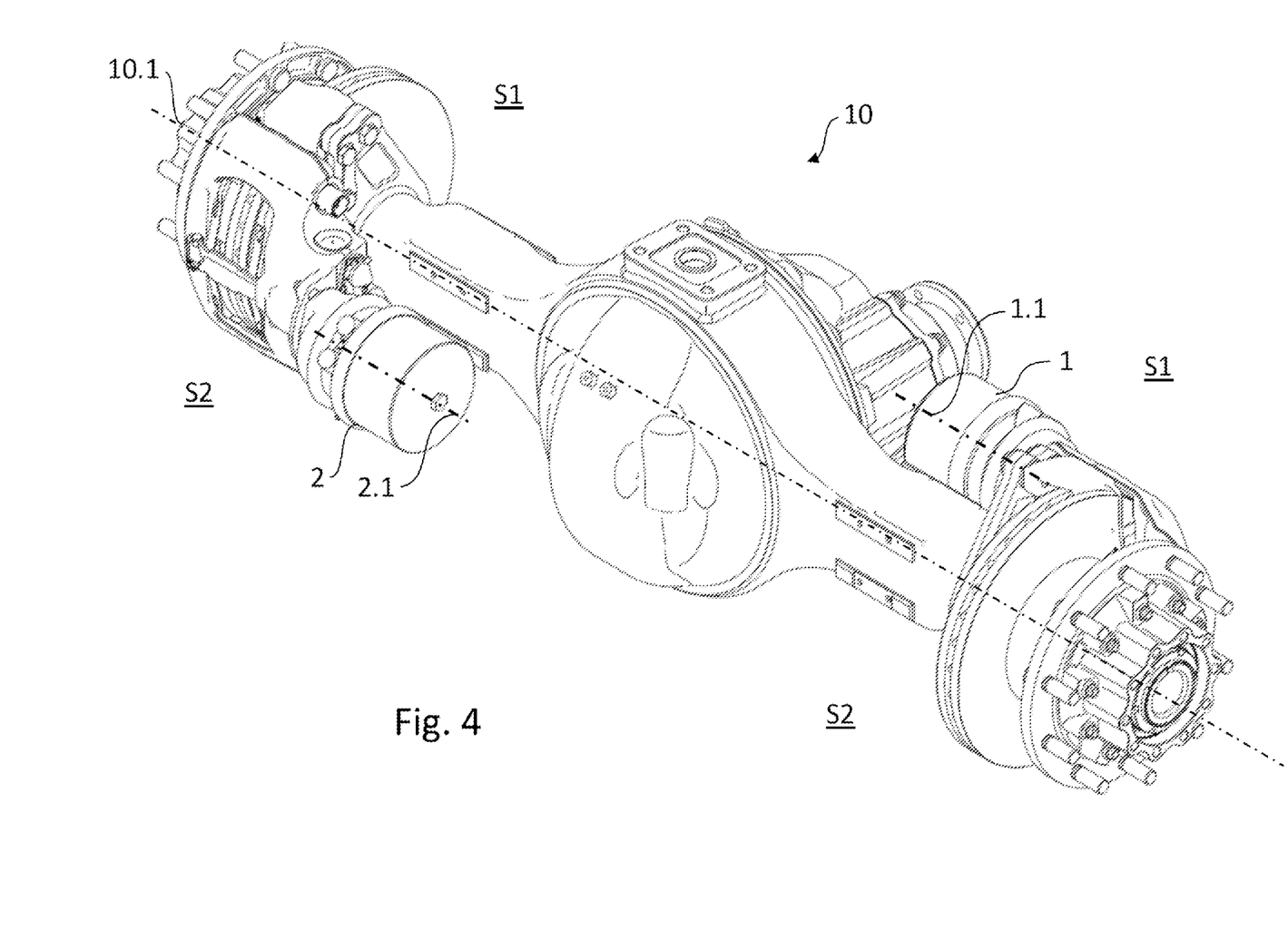
FIG. 4 is a detailed perspective view of the axle construction according to the first embodiment.

FIG. 1 is a highly schematic, perspective view of an axle construction 10 for a motor vehicle according to a first embodiment of the present disclosure, wherein FIG. 2 is a highly schematic side view of the first embodiment. FIG. 3 is a detailed plan view of the axle construction 10, wherein FIG. 4 is a detailed perspective view of the axle construction 10. The axle construction 10 of the exemplary first embodiment of the present disclosure is described with common reference to FIGS. 1 to 4.

The axle construction 10 is intended in particular for use with a utility vehicle, for example, a truck, and is consequently in particular a utility vehicle axle construction 10. The axle construction 10 is used initially in conventional manner for assembly of a first (for example, advantageously right) wheel W1 which is illustrated only schematically in FIG. 3, and a second (advantageously, for example, left) wheel W2 which is illustrated only schematically in FIG. 3, wherein, for example, single or dual tires are possible.

The reference numeral L indicates the longitudinal direction of the motor vehicle. The reference numeral Q indicates the transverse direction of the motor vehicle. The reference numeral H indicates the vertical direction of the motor vehicle.

The axle construction 10 is provided with a first brake cylinder 1 with the brake caliper B1 and a second brake cylinder 2 with the brake caliper B2.

The first brake cylinder 1 comprises a center line 1.1 and is advantageously used to brake the first wheel W1, wherein the second brake cylinder 2 comprises a second center line 2.1 and is advantageously used to brake the second wheel W2.

An axle gear G serves to connect a drive shaft for driving the motor vehicle, in particular the first wheel W1 and the second wheel W2.

A particular feature is that the first brake cylinder 1 is optionally arranged together with the brake caliper B1 thereof at one side S1 of the reference plane P and consequently in particular in the longitudinal direction L of the motor vehicle, for example, in front of the axle construction 10, and the second brake cylinder 2 is optionally arranged together with the brake caliper B2 thereof at the other side S2 of the reference plane P and consequently in particular in the longitudinal direction L of the motor vehicle, for example, behind the axle construction 10.

In the first embodiment, the first center line 1.1 and the second center line 2.1 extend substantially parallel with the reference plane P and in particular substantially parallel with the longitudinal axis 10.1 and consequently in particular substantially horizontally. In the context of the present disclosure, however, it is not absolutely necessary for the first center line 1.1 and the second center line 2.1 to extend parallel and/or horizontally, but instead it is, for example, also possible for the first center line 1.1 to extend, for example, parallel with the longitudinal axis 10.1, wherein the second center line 2.1 extends in a non-parallel manner with respect to the longitudinal axis 10.1 and/or in a non-horizontal manner (for example, in an extreme case, substantially vertically), or vice versa.

Figure 5:
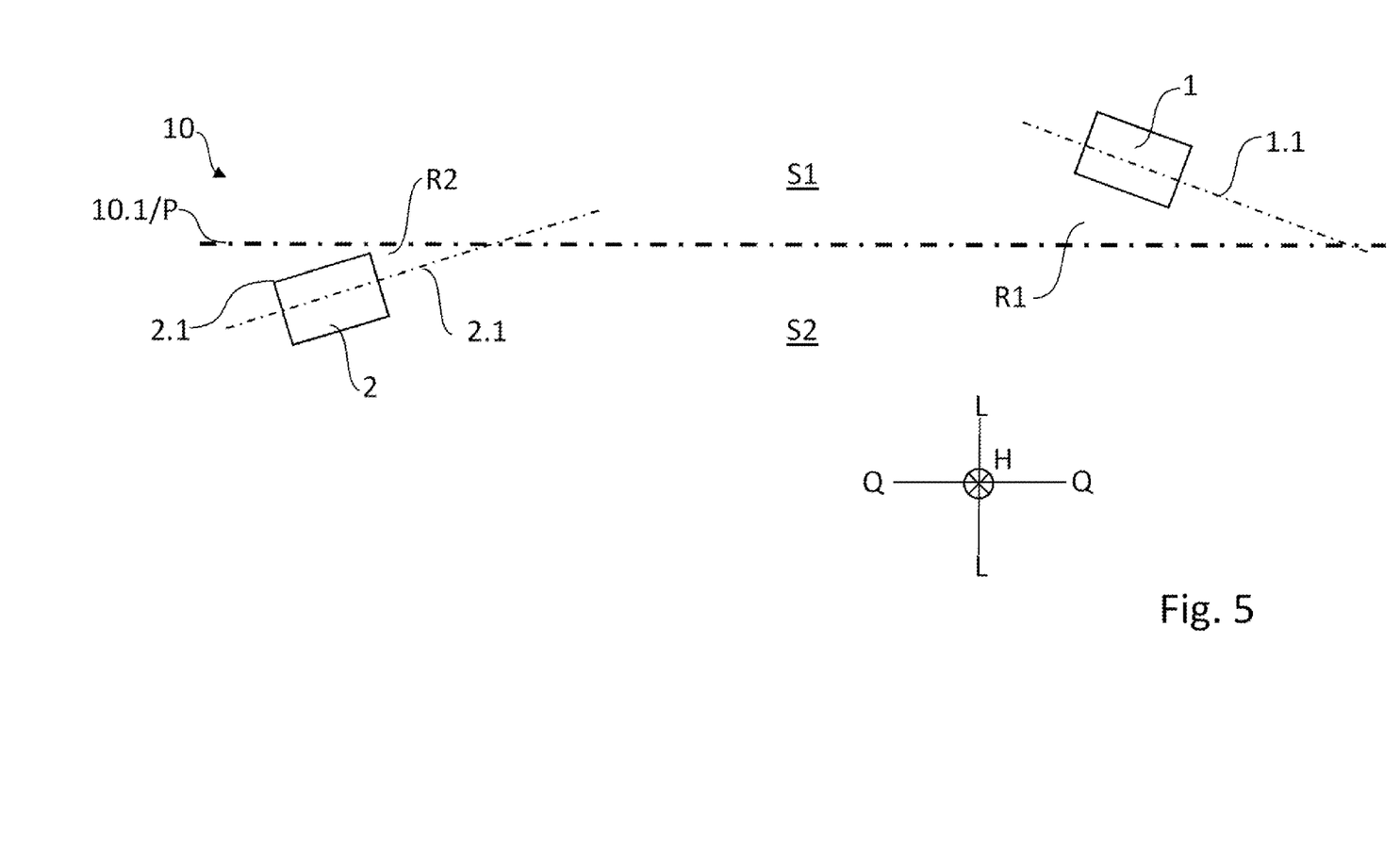
FIG. 5 is a schematic plan view of an axle construction according to a second embodiment of the present disclosure.
Figure 6:
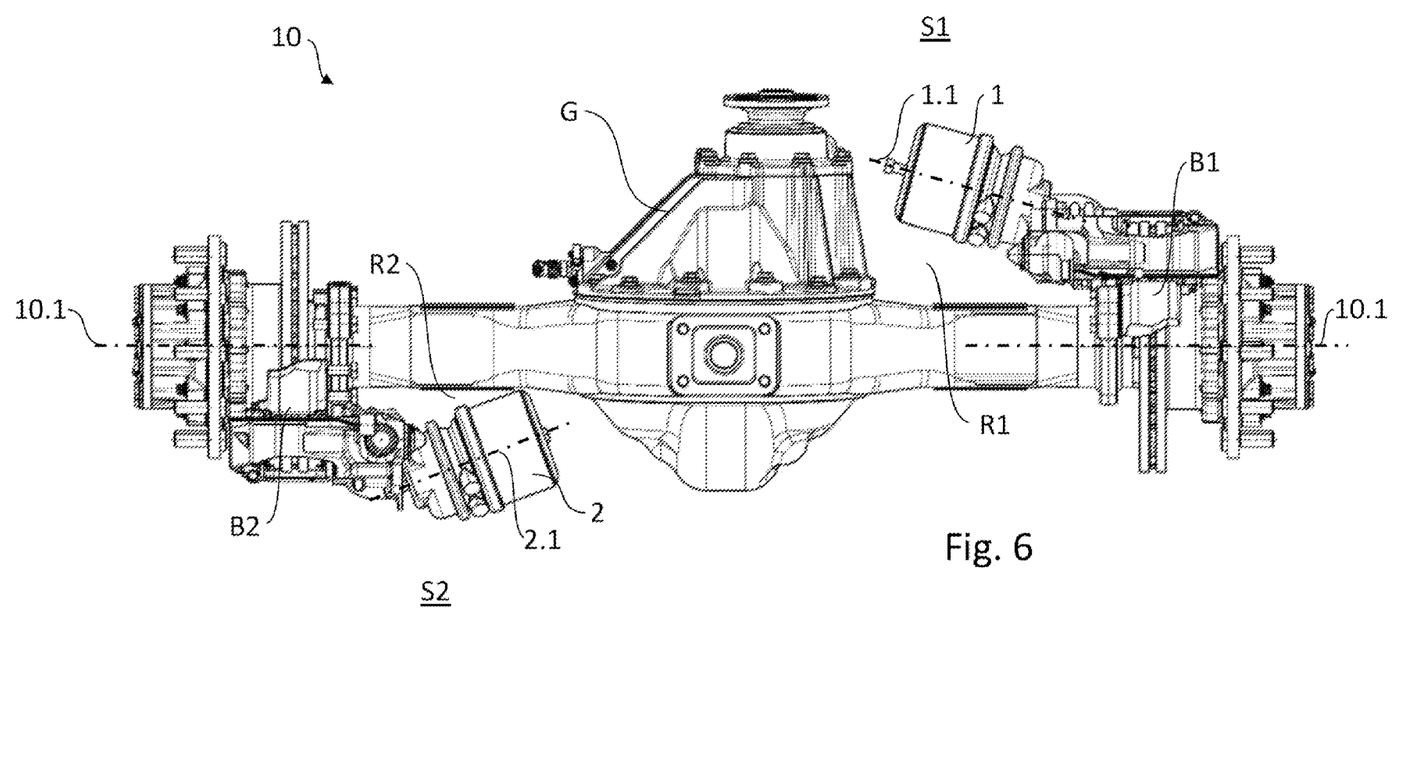
FIG. 6 is a detailed plan view of an axle construction according to the second embodiment.

FIG. 5 is a highly schematic plan view of an axle construction 10 according to a second embodiment, wherein FIG. 6 is a detailed plan view of the axle construction 10. The axle construction 10 of the exemplary second embodiment is described with common reference to FIGS. 5 and 6.

Firstly, in the second embodiment, the first center line 1.1 and the second center line 2.1 may also extend substantially horizontally.

However, a particular feature is that the first center line 1.1 is orientated to be inclined away from the reference plane P and/or the longitudinal axis 10.1 so that a space R1 between the first brake cylinder 1 and the axle construction 10 can be increased. However, the second center line 2.1 may be orientated to be inclined toward the reference plane P and/or the longitudinal axis 10.1 so that a space R2 between the second brake cylinder 2 and the axle construction 10 can be reduced. In this instance, it is possible for the angle of inclination of the first center line 1.1 and the angle of inclination of the second center line 2.1 to be substantially of the same size or of different sizes. In the second embodiment, the first center line 1.1 and the second center line 2.1 consequently extend in a non-parallel manner with respect to the reference plane P and in a non-parallel manner with respect to the longitudinal axis 10.1.

Furthermore, embodiments are possible in which both the first center line 1.1 and the second center line 2.1 are orientated to be inclined away from the reference plane P and/or the longitudinal axis 10.1, or in which both the first center line 1.1 and the second center line 2.1 are orientated to be inclined toward the reference plane P and/or the longitudinal axis 10.1.

The first embodiment and the second embodiment preferably comprise an axle gear G for connecting a drive shaft.

However, embodiments with a single-wheel drive are also possible. Thus, the axle construction 10 may, for example, have a first single-wheel motor for driving the first wheel W1 and a second single-wheel motor for driving the second wheel W2. In this instance, it is possible for the first single-wheel motor to be arranged at least partially or substantially completely at one side S1 of the reference plane P and/or for the second single-wheel motor to be arranged at least partially or substantially completely at the other side S2 of the reference plane P.

Figure 7:
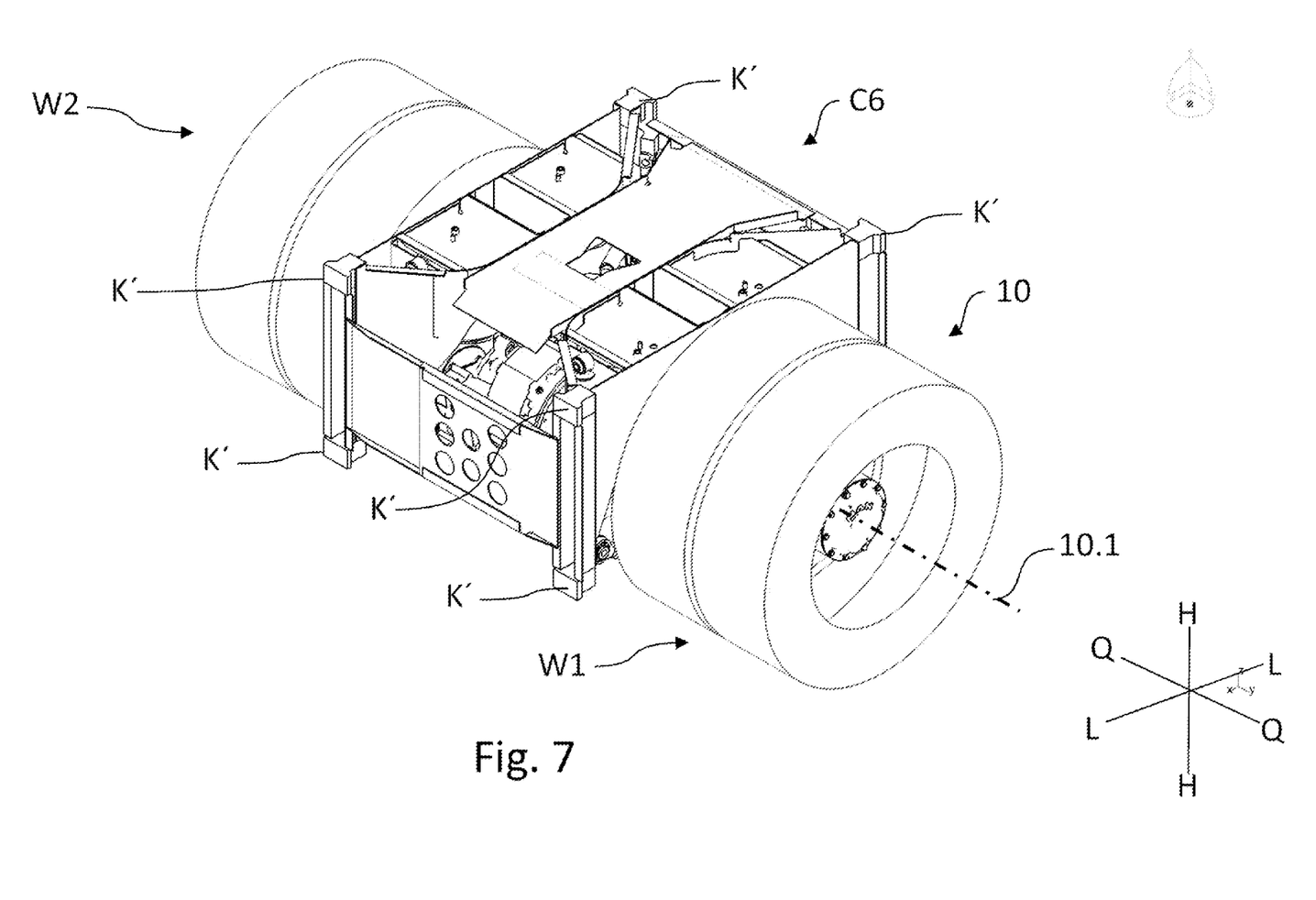
FIG. 7 shows a chassis module for mounting an axle construction according to an embodiment of the present disclosure.
Figure 8:
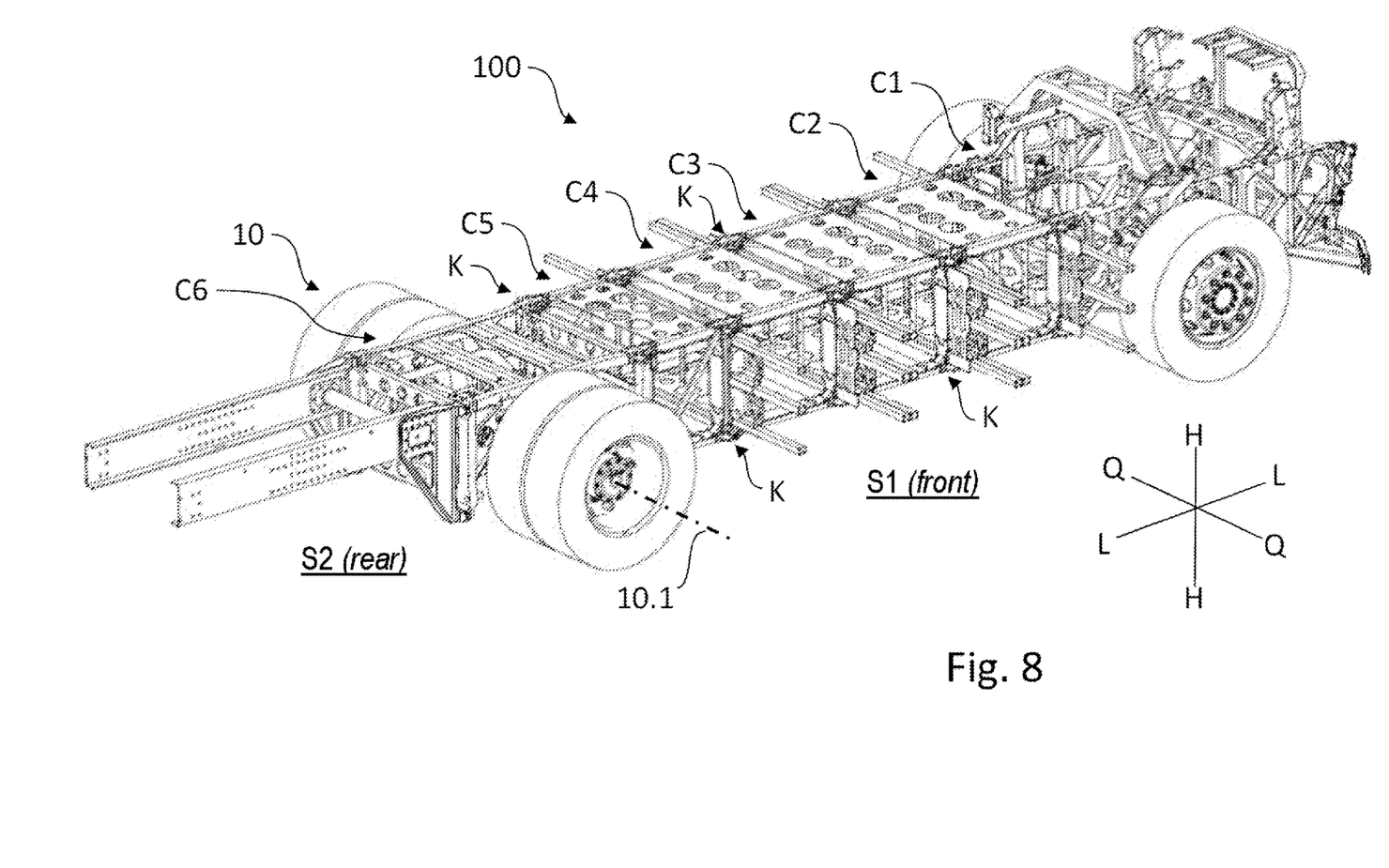
FIG. 8 shows a motor vehicle chassis having an axle construction according to an embodiment of the present disclosure.

FIG. 7 shows a chassis module C6 for assembly of an axle construction 10 according to an embodiment of the present disclosure, wherein FIG. 8 shows a motor vehicle chassis 100 having a chassis module C6 which has an axle construction as shown in FIG. 7 and a large number of additional chassis modules C1 to C5.

The individual chassis modules C1 to C6 preferably have four front connection nodes K' (FIG. 7) and four rear connection nodes K' (FIG. 7), wherein the connection nodes K' may be constructed, for example, as a cast, forged or sheet metal component. The individual connection nodes K' of the chassis modules C1 to C6 serve to form releasable connection node pairs K (FIG. 8), via which the chassis modules C1 to C6 can be releasably connected to each other in order to be able to form the chassis 100. It is possible to use, for example, screw or clamping connections as releasable connection techniques.

The chassis module C6 is consequently preferably connected to the chassis module C5 by means of preferably four connection node pairs K, wherein the chassis module C5 is connected to the chassis module C4 preferably by means of four connection node pairs K, etc.

The individual chassis modules C1 to C6 may have as a carrier structure, for example, a plurality of longitudinal carriers, a plurality of transverse carriers and a plurality of vertical carriers which may advantageously be configured, for example, as sheet metal or profile components, but may also comprise, for example, substantially plate-like carrier structures. The profile components may be closed or open profiles, for example, hollow profiles or, for example, substantially U-, L-, I- or hat-like profiles. The carrier structure of the individual chassis modules C1 to C6 is consequently advantageously not configured, as in, for example, a ladder-frame-like chassis in a 2-dimensional manner, but instead preferably in a 3-dimensional manner, for example, as a framework and/or box construction, as shown, for example, in FIGS. 7 and 8 by way of example.

The present disclosure is not limited to the above-described preferred embodiments. Instead, a large number of variants and modifications which also make use of the notion of the present disclosure and which are therefore included within the scope of protection are possible. Furthermore, the present disclosure also claims protection for the subject-matter and the features of the dependent claims regardless of the features and claims which are referred to.

LIST OF REFERENCE NUMERALS

10 Axle construction
10.1 Longitudinal axis
1 Brake cylinder
1.1 Center line
W1 Wheel
R1 Space
B1 Brake caliper
2 Brake cylinder
2.1 Center line
W2 Wheel
R2 Space
B2 Brake caliper
P Reference plane
S1 One side of the reference plane, for example, side in front of the reference plane
S2 Other side of the reference plane, for example, side behind the reference plane
100 Chassis
C1 to C5 Chassis modules
C6 Chassis module for mounting an axle construction
K' Connection node
K Connection node pairs
G Axle gear
L Longitudinal direction of the motor vehicle
Q Transverse direction of the motor vehicle
H Vertical direction of the motor vehicle

The invention claimed is:

1. An axle construction for a motor vehicle and for mounting a first wheel and a second wheel, wherein the axle construction has a longitudinal axis and defines a vertical reference plane which extends along the longitudinal axis, comprising:
   a first brake cylinder, and
   a second brake cylinder, wherein
   the first brake cylinder is arranged at one side of the reference plane and the second brake cylinder is arranged at the other side of the reference plane.

2. The axle construction as claimed in claim 1, wherein the motor vehicle is a utility vehicle,
   the first brake cylinder is used for braking the first wheel, or
   the second brake cylinder is used for braking the second wheel.

3. The axle construction as claimed in claim 1, wherein the first brake cylinder has a first center line and the second brake cylinder has a second center line.

4. The axle construction as claimed in claim 3, wherein
   the first center line extends substantially parallel with the reference plane or the longitudinal axis, or
   the second center line extends substantially parallel with the reference plane or the longitudinal axis.

5. The axle construction as claimed in claim 3, wherein the first center line
   is orientated to be inclined away from the reference plane or the longitudinal axis, or
   extends in a non-parallel manner with respect to the reference plane or the longitudinal axis.

6. The axle construction as claimed in claim 3, wherein the first center line is orientated to be inclined away from the reference plane or the longitudinal axis in such a manner that a space between the first brake cylinder and the axle construction is increased.

7. The axle construction as claimed in claim 3, wherein the second center line
   is orientated to be inclined toward the reference plane or the longitudinal axis, or
   extends non-parallel with the reference plane or the longitudinal axis.

8. The axle construction as claimed in claim 3, wherein the second center line is orientated to be inclined toward the reference plane or the longitudinal axis in such a manner that a space between the second brake cylinder and the axle construction is reduced.

9. The axle construction as claimed in claim 3, wherein
   the first center line and the second center line are orientated to be inclined away from the reference plane or the longitudinal axis, or
   the first center line and the second center line are orientated to be inclined toward the reference plane or the longitudinal axis.

10. The axle construction as claimed in claim 3, wherein the first center line or the second center line extends non-vertically.

11. The axle construction as claimed in claim 3, wherein the first center line and the second center line
    extend substantially parallel with each other, or
    extend non-parallel with each other or are orientated to be inclined through angles of different sizes.

12. The axle construction as claimed in claim 3, wherein the first center line or the second center line extends in a substantially horizontal or non-horizontal manner.

13. The axle construction as claimed in claim 3, wherein at least two of the first center line, the second center line or the longitudinal axis extend substantially at the same height.

14. The axle construction as claimed in claim 1, wherein the first brake cylinder and the second brake cylinder are arranged in an asymmetrical manner.

15. The axle construction as claimed in claim 1, wherein the first brake cylinder is arranged substantially completely at one side of the reference plane or second brake cylinder is arranged substantially completely at the other side of the reference plane.

16. The axle construction as claimed in claim 1, wherein the axle construction is a drive axle construction.

17. The axle construction as claimed in claim 16, wherein the drive axle construction is driven electrically, hydraulically or by means of an internal combustion engine.

18. The axle construction as claimed in claim 1, wherein the axle construction has an axle gear for connecting a drive shaft for driving the motor vehicle.

19. The axle construction as claimed in claim 1, wherein the axle construction has a first single-wheel motor for driving the first wheel and a second single-wheel motor for driving the second wheel.

20. The axle construction as claimed in claim 19, wherein the first single-wheel motor is arranged at one side of the reference plane or the second single-wheel motor is arranged at the other side of the reference plane.

21. The axle construction as claimed in claim 1, further comprising a first brake caliper associated with the first brake cylinder and a second brake caliper associated with the second brake cylinder, wherein the first brake caliper is arranged at one side of the reference plane and the second brake caliper is arranged at the other side of the reference plane.

22. A motor vehicle having a chassis comprising a plurality of chassis modules which can be releasably mounted on each other, wherein an axle construction as claimed in claim 1 is mounted on a chassis module.

23. The motor vehicle as claimed in claim 22, wherein
the motor vehicle is a utility vehicle, or
the chassis modules can be releasably mounted on each other by means of four connection node pairs in each case.

24. The motor vehicle as claimed in claim 22, wherein the individual chassis modules have as a carrier structure a plurality of longitudinal carriers, transverse carriers and vertical carriers or a 3-dimensional carrier structure.

\* \* \* \* \*